(12) United States Patent
Barenthin

(10) Patent No.: US 11,929,465 B2
(45) Date of Patent: Mar. 12, 2024

(54) ENERGY STORAGE ELEMENT AND MANUFACTURING METHOD

(71) Applicant: VARTA Microbattery GmbH, Ellwangen Jagst (DE)

(72) Inventor: Nils Barenthin, Ellwangen (DE)

(73) Assignee: VARTA Microbattery GmbH, Ellwangen Jagst (DE)

( * ) Notice: Subject to any disclaimer, the term of this patent is extended or adjusted under 35 U.S.C. 154(b) by 174 days.

(21) Appl. No.: 17/067,111

(22) Filed: Oct. 9, 2020

(65) Prior Publication Data

US 2021/0111437 A1     Apr. 15, 2021

(30) Foreign Application Priority Data

Oct. 11, 2019 (EP) .................................. 19202862

(51) Int. Cl.
*H01M 50/56*     (2021.01)
*H01M 10/0587*     (2010.01)
(Continued)

(52) U.S. Cl.
CPC ..... *H01M 10/0587* (2013.01); *H01M 50/561* (2021.01)

(58) Field of Classification Search
CPC ...... H01M 50/30; H01M 50/20; H01M 50/10; H01M 10/0587
See application file for complete search history.

(56) References Cited

U.S. PATENT DOCUMENTS 5,149,604 A    9/1992 Nakanishi
10,930,899 B2   2/2021 Kreidler et al.
(Continued)

FOREIGN PATENT DOCUMENTS

CN    206602136 U    10/2017
CN    109065822 A    12/2018
(Continued)

OTHER PUBLICATIONS

First Office Action dated Sep. 2, 2022, of counterpart Chinese Patent Application No. 202011071090.5, along with an English translation.

*Primary Examiner* — Kenneth J Douyette
(74) *Attorney, Agent, or Firm* — DLA Piper LLP (US)

(57) ABSTRACT

An energy storage element includes a housing enclosing an interior space, which housing is formed of a first metal housing part and a second metal housing part and has a substantially circular upper side and a substantially circular lower side spaced from one another and parallel to one another, and an annular housing side that connects the upper side and the lower side; a winding arranged in the interior, which winding includes a strip-shaped positive and a strip-shaped negative electrode and a strip-shaped separator arranged between the electrodes that are wound in a spiral around a winding axis; wherein the winding has a first end face and a second end face and an annularly circumferential winding outer side, the first and second end faces face in the direction of the circular and mutually parallel upper side and lower side such that the winding axis is oriented perpendicular or at least substantially perpendicular to the upper side and the lower side, and the winding has an axial cavity through which the winding axis runs; and an electrically conductive pin arranged in the cavity and electrically connects one of the electrodes of the winding to one of the housing parts, wherein the first and the second housing part are designed such that they are able moveable against each other along an axis running vertically through the circular upper side and the circular lower side of the housing, and the pin is configured such that the electrical contact to one of the electrodes of the winding is broken when the housing parts move away from one another along the axis.

7 Claims, 2 Drawing Sheets

(51) Int. Cl.
*H01M 50/50* (2021.01)
*H01M 50/552* (2021.01)

(56) References Cited

U.S. PATENT DOCUMENTS

| | | |
|---|---|---|
| 2001/0036571 A1 | 11/2001 | Oogami et al. |
| 2002/0119364 A1* | 8/2002 | Bushong .............. H01M 10/48 |
| | | 429/61 |
| 2004/0237290 A1 | 12/2004 | Ura |
| 2005/0233212 A1 | 10/2005 | Kaun |
| 2011/0223455 A1 | 9/2011 | Kimura et al. |
| 2012/0015224 A1 | 1/2012 | Pytlik et al. |
| 2012/0100406 A1 | 4/2012 | Gaugler |
| 2013/0216881 A1 | 8/2013 | Gaugler |
| 2018/0102511 A1 | 4/2018 | Gaugler |

FOREIGN PATENT DOCUMENTS

| | | |
|---|---|---|
| CN | 109564991 A | 4/2019 |
| DE | 895011 | 10/1953 |
| DE | 20 2017 006 038 | 2/2019 |
| EP | 3176848 | 6/2017 |
| JP | H03-241658 A | 10/1991 |
| JP | 2006-173136 A | 6/2006 |
| KR | 20110102152 A | 9/2011 |
| WO | 2005/091403 | 9/2005 |
| WO | 2010/089152 | 8/2010 |
| WO | 2010/146154 | 12/2010 |
| WO | 2012/048995 | 4/2012 |

\* cited by examiner

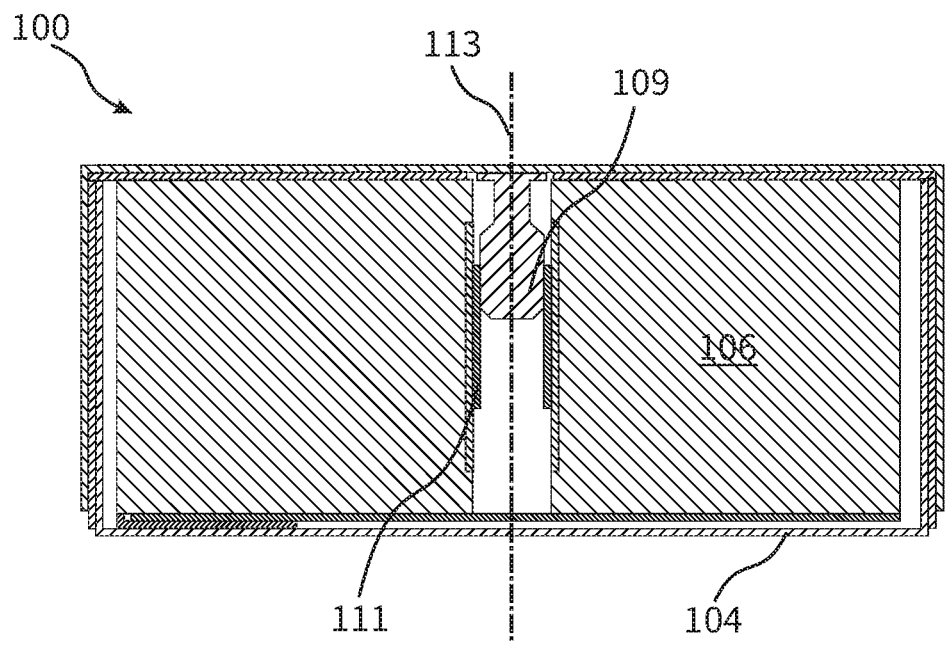
*Fig. 3*A
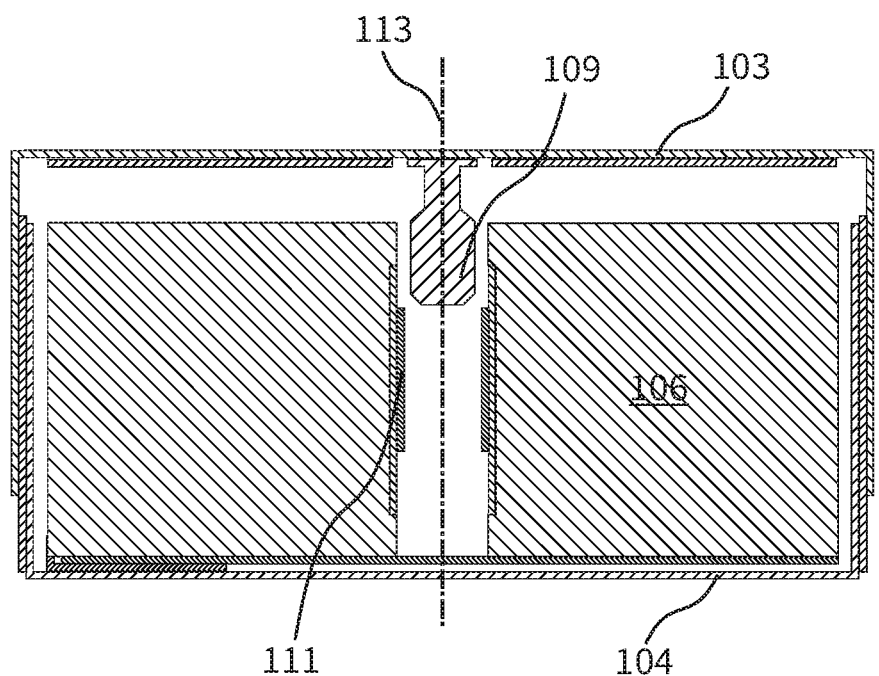
*Fig. 3*B

ENERGY STORAGE ELEMENT AND MANUFACTURING METHOD

TECHNICAL FIELD

This disclosure relates to an energy storage element and a method of manufacturing an energy storage element.

BACKGROUND

An energy storage element means an electrochemical cell or a battery capable of storing electrical energy, comprising a plurality of electrically interconnected energy storage elements capable of storing electrical energy and arranged in a common housing. Each electrochemical cell and thus each energy storage element comprises at least one positive and at least one negative electrode.

An electrochemical energy-yielding reaction takes place in such energy storage elements, which reaction consists of two electrically interlinked but spatially separate partial reactions. One partial reaction that takes place at a comparatively lower redox potential occurs at the negative electrode, and one partial reaction that takes place at a comparatively higher redox potential occurs at the positive electrode. During discharge, electrons are released at the negative electrode through an oxidation process, resulting in a flow of electrons across an external consumer to the positive electrode, from which a corresponding amount of electrons is absorbed. A reduction process thus takes place at the positive electrode. At the same time, there is a flow of ions corresponding to the electrode reaction within the energy storage element for charge balancing purposes. The flow of ions is ensured by an ion-conducting electrolyte.

In secondary (rechargeable) energy storage elements, the discharge reaction is reversible, and there is thus the option of reversing the conversion of chemical energy into electrical energy that took place during the discharge.

If the terms "anode" and "cathode" are used in connection with secondary energy storage elements, the electrodes are generally named according to their discharge function. The negative electrode in such energy storage elements is thus the anode, and the positive electrode is the cathode.

One known example of a secondary energy storage element is the lithium-ion cell comprising electrodes that are able to reversibly absorb lithium ions and release them again, and an electrolyte that contains lithium ions.

Lithium-ion cells generally contain their electrodes and separators in the form of a composite body. Such a composite body may be a cell stack consisting of a plurality of individual cells. The composite body is however very often also an individual cell in wound form (wound composite body or short winding).

Positive and negative electrodes and separators usually lie flat on top of one another in the composite bodies. The electrodes and separators are usually, for example, connected to one another through lamination or through adhesive bonding. Composite bodies, regardless of whether or not they are wound, usually comprise the sequence positive electrode/separator/negative electrode. Composite bodies are often manufactured as what are known as dual cells with the possible sequences: negative electrode/separator/positive electrode/separator/negative electrode or positive electrode/separator/negative electrode/separator/positive electrode.

The electrodes of lithium-ion cells usually each comprise a metal current collector and electrochemically active components (often also referred to as active materials) and electrochemically inactive components.

The current collectors make electrical contact with the electrochemically active components over as large an area as possible. They usually consist of strip-shaped, flat metal substrates, for example, consisting of metal foils or a foamed metal or a metallized nonwoven.

All materials that are able to absorb lithium ions and release them again come into consideration as active materials for secondary lithium-ion systems. Carbon-based materials such as graphite carbon or non-graphite carbon materials capable of intercalating lithium are in particular known in this respect for the negative electrode of secondary lithium-ion systems. Metal and semi-metal materials able to be alloyed with lithium may furthermore also be used. The elements tin, antimony and silicon are thus, for example, capable of forming intermetallic phases with lithium. The carbon-based active materials may in particular also be combined with the metal and/or semi-metal materials.

Lithium metal oxide compounds and lithium metal phosphate compounds such as $LiCoO_2$ and $LiFePO_4$ come into consideration for the positive electrode of secondary lithium-ion systems, for example. Lithium nickel manganese cobalt oxide (NMC) having the molecular formula $LiNi_xMn_yCo_zO_2$ (wherein x+y+z is typically 1), lithium manganese oxide (LMO) having the molecular formula $LiMn_2O_4$, or lithium nickel cobalt aluminium oxide (NCA) having the molecular formula $LiNi_xCo_yAl_zO_2$ (wherein x+y+z is typically 1) are in particular also well-suited. Mixtures of the materials may also be used.

Electrode binders and conductors may be mentioned first and foremost as electrochemically inactive components. The electrode binders ensure mechanical stability of the electrodes and create contact between the particles consisting of electrochemically active material and contact between the particles and the current collector. Conductors such as carbon black increase the electrical conductivity of the electrodes.

Porous plastic films, for example, consisting of a polyolefin or a polyetherketone, in particular come into consideration as separators for lithium-ion cells. Nonwovens and fabrics consisting of these materials may also be used.

Lithium-ion cells may, for example, contain a mixture of organic carbonates in which a lithium salt is dissolved as ion-conducting electrolyte. In principle any lithium salt that is known for lithium-ion cells comes into consideration for this purpose. One prominent example of this is lithium hexafluorophosphate ($LiPF_6$).

The electrodes and separators of the lithium-ion cells are preferably impregnated with the electrolyte.

Lithium-ion cells exist in very small structural forms, in particular including in button cell form. Button cells, as is known, have a usually cylindrical housing that consists of, for example, nickel-plated steel or sheet metal and whose height is equal to or smaller than its diameter. The housing is generally formed of two metal housing parts between which an electrically insulating seal is arranged. One of the housing parts is electrically connected to a positive electrode enclosed by the housing and accordingly has a positive polarity. The other is electrically connected to a negative electrode enclosed by the housing and accordingly has a negative polarity. The seal is intended to prevent any electrical contact between the housing parts of opposing polarities. It is also intended to counteract any escape and also any penetration of liquid, moisture or gases out of or into the housing.

Button cells having lithium ion-based windings manufactured by winding strip-shaped electrodes and at least one strip-shape separator in a spiral are described, for example, in WO 2010/146154 A2, in WO 2012/048995 A1 and in WO 2010/089152 A1.

Creating electrical contact between the electrodes is always a problem in button cells having such windings. In known cells, contact is usually created through a welded connection. The current collectors of the electrodes may thus be welded directly to the housing parts of a button cell housing, as is described, for example, in DE 20 2017 006 038 U1. As an alternative, they may be welded to electrical conductors connected to the housing parts. Such electrical contacts are extremely difficult to create due to the small dimensions of button cells and extremely difficult to integrate into mass manufacturing processes. The housings of button cells have decidedly low wall thicknesses and may be damaged in welding processes. It is also possible for the input of heat, which is unavoidable in welding, to cause problems, for example, to damage a winding inside.

It could therefore be helpful to provide an improved solution that creates contact between the electrodes of a winding and the housing parts of a button cell.

SUMMARY

I provide an energy storage element including: a housing enclosing an interior space, which housing is formed of a first metal housing part and a second metal housing part and has a substantially circular upper side and a substantially circular lower side spaced from one another and parallel to one another, and an annular housing side wall that connects the upper side and the lower side; a winding arranged in the interior, which winding comprises a strip-shaped positive and a strip-shaped negative electrode and a strip-shaped separator arranged between the electrodes that are wound in a spiral around a winding axis, wherein the winding has a first end face and a second end face and an annularly circumferential winding outer side, the first and second end faces face in the direction of the circular and mutually parallel upper side and lower side such that the winding axis is oriented perpendicular or at least substantially perpendicular to the upper side and the lower side, and the winding has an axial cavity through which the winding axis runs; and an electrically conductive pin arranged in the cavity and electrically connects one of the electrodes of the winding to one of the housing parts, wherein the first and the second housing part designed such that they are able moveable against each other along an axis running vertically through the circular upper side and the circular lower side of the housing, and the pin is configured such that the electrical contact to one of the electrodes of the winding is broken when the housing parts move away from one another along the axis.

I further provide a method of manufacturing an energy storage element having a housing enclosing an interior space, which housing is formed of a first metal housing part and a second metal housing part and has a circular upper side and a circular lower side spaced from one another and parallel to one another, and an annular housing side wall that connects the upper side and the lower side; a winding arranged in the interior space, which winding comprises a strip-shaped positive and a strip-shaped negative electrode and a strip-shaped separator arranged between the electrodes that are wound in a spiral around a winding axis, wherein the winding has a first end face and a second end face and an annularly circumferential winding outer side, and the end faces face in the direction of the circular and mutually parallel upper side and lower side such that the winding axis is oriented perpendicular or at least substantially perpendicular to the upper and the lower side, and the winding has an axial cavity through which the winding axis runs, the method including arranging an electrically conductive pin in the cavity to create electrical contact between one of the metal housing parts and one of the electrodes.

BRIEF DESCRIPTION OF THE DRAWINGS

FIGS. 3A and 3B show a further example of an energy storage element according to configuration B in a cross-sectional view in different states.

DETAILED DESCRIPTION

Figure 1:
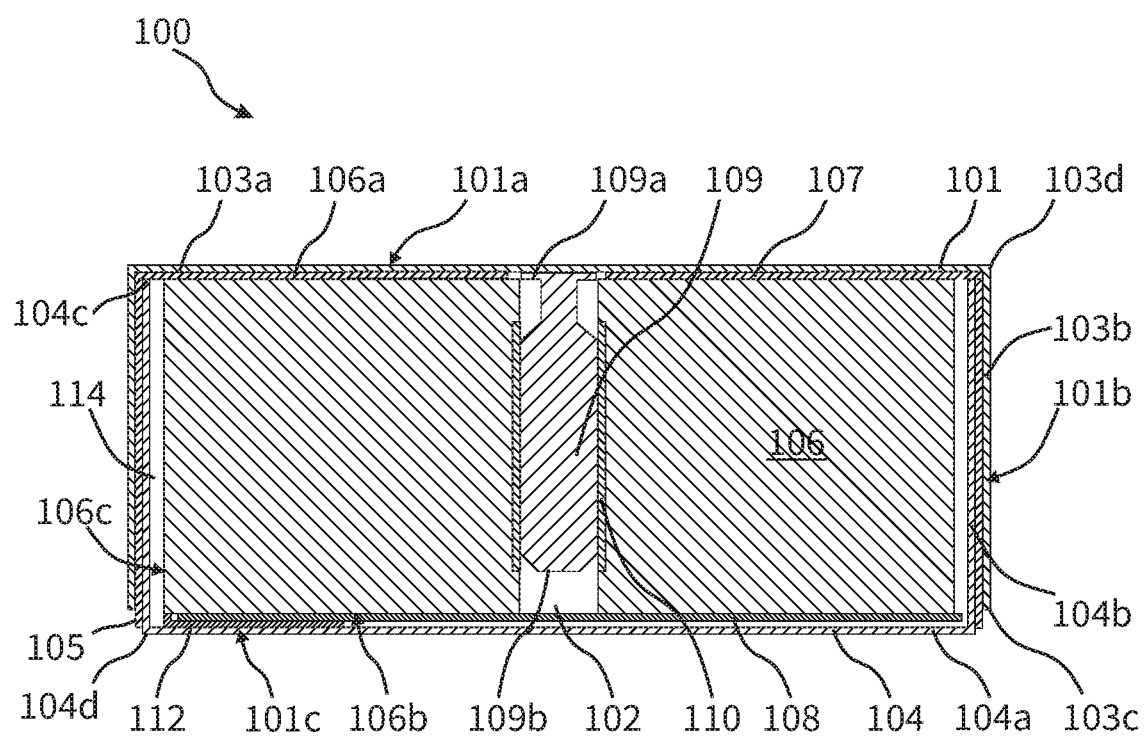
FIG. 1 shows one example of an energy storage element according to configuration A in a cross-sectional view.

My energy storage element is always distinguished by a combination of the following features:
 a. It comprises a housing enclosing an interior, which housing is formed of a first metal housing part and a second metal housing part and has a circular upper side and a circular lower side that are spaced from one another and parallel to one another, and an annular housing side wall that connects the upper and the lower side.
 b. It comprises a winding arranged in the interior, which winding comprises a strip-shaped positive and a strip-shaped negative electrode and a strip-shaped separator arranged between the electrodes, which are wound in a spiral around a winding axis.
 c. The winding has a first end face and a second end face and an annularly circumferential winding outer side.
 d. The end faces face in the direction of the circular and mutually parallel upper and lower side such that the winding axis is oriented perpendicular or at least substantially perpendicular to the upper and the lower side.
 e. The winding has an axial cavity through which the winding axis runs.
 f. An electrically conductive pin is arranged in the cavity and electrically connects one of the electrodes to one of the housing parts.

The two metal housing parts are preferably electrically insulated from one another, for example, by an annular plastic seal arranged between the two housing parts. The two housing parts, when they are electrically connected to the electrodes, may thus serve as poles of the energy storage element.

The housing parts may consist of, for example, nickel-plated steel or sheet metal. Furthermore, trimetal, for example, having the sequence nickel, steel (or stainless steel) and copper, also comes into consideration as metal material. It is also possible for one of the housing parts to be formed from aluminium or an aluminium alloy, whereas the other housing part consists of steel or trimetal.

Winding the energy storage element does not have to differ from known windings mentioned above. Its electrodes are particularly preferably designed to be able to reversibly store and release lithium ions. In other words, the energy storage element is preferably a lithium-ion cell. In this example, the electrodes preferably have one of the above-mentioned active materials for the electrodes of lithium-ion cells and are preferably impregnated with the mentioned electrolyte. The separator may, for example, be the above-mentioned porous plastic film.

Particularly preferably, the winding has a cylindrical or hollow-cylindrical geometry, for instance like the windings illustrated in FIGS. 3a and 3b of WO 2010/146154 A2. The first and the second end face in particular in these examples are preferably delimited towards the annularly circumferential winding outer side by two circularly circumferential edges.

The end faces are preferably flat. At least one of the end faces may, however, also have a curvature that rises starting from the circularly circumferential edges in the direction of the centre of the end face, as is illustrated, for example, in FIG. 8 of EP 3 176 848 A1.

To manufacture the winding, the electrodes and the separator may, for example, be wound onto a winding mandrel or onto a winding core. The axial cavity results, for example, from removing the winding from the winding mandrel.

Preferably, at least one electrical insulator, for example, in the form of plastic films adhesively bonded to the inner side of the housing or in the form of a thin plastic disc, may be arranged between the end faces of the winding and the housing. Such an insulator also protects the housing against direct contact with the electrolyte and thereby against electrolyte-induced corrosion.

The energy storage element is preferably distinguished by at least one of the additional features a. to f.:
  a. The pin has a first end fixed to an inner side of the housing part connected to one electrode via the pin, and a second, free end.
  b. The free end is a cone.
  c. The pin comprises a shaft between the two ends.
  d. The pin consists of a metal.
  e. The pin is hollow or solid.
  f. The pin has a length that is less than the shortest distance between the end faces of the winding.

Features a., c., d., e. and f., particularly preferably features a. to f., are preferably implemented in combination with one another.

It is not essential how the pin is fixed to the housing part, but what is important is that there is an electrically conductive connection to the housing part. The pin is preferably welded onto the housing part.

The cone preferably facilitates insertion of the pin into the cavity, for example. The diameter of the cone decreases in the direction of its vertex. The shaft connects the ends of the pin, and it preferably has a constant diameter at least in one section, preferably over its entire length.

If the pin is electrically connected to the positive electrode, then it preferably consists of aluminium or an aluminium alloy or a stainless steel. The housing part electrically connected to the pin may in this example also consist of aluminium or an aluminium alloy or stainless steel. If the pin is electrically connected to the negative electrode, then it preferably consists of copper or of a copper alloy or nickel or a nickel alloy or a stainless steel.

Due to the fact that the length of the pin is less than the shortest distance between the end faces of the winding, it is ensured that the pin does not cause any short circuit between the first and the second housing part.

The length of the pin is preferably 10 to 90% of the shortest distance between the end faces of the winding, more preferably 20 to 80%, in particular 30 to 70% of the shortest distance between the end faces of the winding.

The energy storage element is preferably distinguished by at least one of the additional features a. and b.:

a. The positive and/or the negative electrode each have a strip-shaped current collector covered at least in regions with electrode material.
  b. The first and/or the second electrode are divided into at least two sections in the longitudinal direction and have an active material section in which the current collector is covered with electrode material, and a terminal contact section in which the current collector is not covered with electrode material.

Features a. and b. are particularly preferably implemented in combination with one another.

The current collectors are preferably strip-shaped foils, nets, gratings, foams, nonwovens or other textile structures consisting of a metal or a metal alloy.

Division of the strip-shaped current collectors into the at least two sections in the longitudinal direction is preferably the result of an intermittent application of electrode material to the respective current collector or the current collectors.

Preferably, the contact section connects the respective electrode directly to the pin. Alternatively, the contact section may also be connected to a separate conductor, for example, through welding, which separate conductor is for its part in electrical contact with the pin.

The strip-shaped current collector of the positive electrode, when the energy storage element is a lithium-ion cell, preferably consists of aluminium or an aluminium alloy. The strip-shaped current collector of the negative electrode, when the energy storage element is a lithium-ion cell, preferably consists of nickel or copper or an alloy of one of these metals.

Particularly preferably, both the current collector of the positive and the current collector of the negative electrode each comprise two terminal contact sections not covered with electrode material and between each of which an active material section covered with electrode material is arranged.

There are two particularly preferred configurations A and B as to how the pin makes electrical contact with one of the electrodes:

According to configuration A, the energy storage element is distinguished by at least one of the additional features a. and b.:
  a. The terminal contact section delimits the axial cavity; it in particular forms a wall or the wall of the axial cavity.
  b. The pin is in direct contact with the terminal contact section delimiting the axial cavity.

Features a. and b. above are particularly preferably implemented in combination with one another.

In this configuration, the pin is preferably connected releasably to the contact section such that the pin is able to be pulled out of the axial cavity.

According to configuration B, the energy storage element is distinguished by at least one of the additional features a. to d.:
  a. A sleeve designed to be electrically conductive is arranged in the cavity.
  b. The sleeve is in electrical contact with the positive or the negative electrode, preferably in direct contact.
  c. The pin is in direct contact with the sleeve.
  d. The pin is inserted at least partly into the sleeve.
  e. The pin bears at least in regions on an inner surface of the inside of the sleeve.

Features a. to d. above are particularly preferably implemented in combination with one another.

In this configuration, the pin is preferably connected releasably to the sleeve such that the pin is able to be pulled out of the sleeve. The sleeve may in turn be the mentioned separate conductor that is electrically connected to the contact section of one of the electrodes. The sleeve and the contact section are preferably connected to one another through welding.

It is furthermore preferred for the energy storage element to be distinguished by at least one of the additional features a. and b.:
  a. The first and the second housing part are both in a cup shape and each have a circular base and an annular side wall.
  b. The first and the second housing part are electrically isolated from one another by an annular seal having electrically insulating properties.
  c. The base and the annular side wall of the cup-shaped housing parts are each connected to one another by a transition region.
  d. The annular side walls are each delimited firstly by the transition regions and secondly by a circumferential free edge that defines a circular opening.
  e. One of the housing parts is inserted into the other housing part with the circumferential free edge at the front such that the side walls of the housing parts overlap and form a double-wall annular housing region.

Features a. to e. above are particularly preferably implemented in combination with one another.

In this example, the first end of the pin is preferably fixed to an inner side of one of the circular bases of the housing parts. The pin is preferably fixed in the center of the circular bases. The pin and the respective housing base to which the pin is fixed preferably enclose an angle of 90° (±5°).

The transition regions preferably comprise the regions of the housing parts that are outside the plane of the respective base but are not yet part of the associated side wall. The transition regions may have a rounded design, for example, a collar-shaped design, or else be in the shape of a sharp edge.

Preferably, the annular side walls of the housing parts have a cylindrical geometry. The side walls may particularly preferably each enclose an angle of 90° with the bases.

When the housing is assembled, the first housing part is preferably inserted into the second housing part with the free edge of its side wall at the front such that the annular side wall of the first housing part and the annular side wall of the second housing part overlap at least in regions and form a circumferential double-wall casing, and the bases of the first and the second housing part are oriented parallel to one another. Alternatively, the second housing part may also be inserted into the first housing part with the free edge of its side wall at the front such that the annular side wall of the first housing part and the annular side wall of the second housing part overlap at least in regions and form a circumferential double-wall casing, and the bases of the first and the second housing part are oriented parallel to one another.

After assembly, the outer sides of the bases of the housing parts form the circular upper side and the circular lower side of the housing. The regionally overlapping side walls of the housing parts form the annular housing side wall connecting the upper and the lower side.

The dimensions of the first and of the second housing part have to be adapted to one another accordingly. The housing part that is intended to be inserted into the other one normally has an annular side wall having a smaller diameter than the side wall of the other housing part. The annular seal is usually also pushed onto the side wall having the smaller diameter before the housing parts are joined together. The composite body is furthermore usually positioned in the housing part having the smaller casing before the housing parts are joined together.

The annular seal preferably consists of a plastic with electrically insulating properties, for example, a polyamide. It first has the task of electrically insulating the housing parts from one another. The seal is furthermore intended to ensure liquid-tight closure of the housing.

In some examples, to close the housing, the free circumferential edge of the larger housing part may be bent inwardly (closure by crimping). However, crimp-free closure is also possible such as illustrated for instance in FIG. 1 of WO 2010/146154 A2.

The energy storage element is particularly preferably a button cell, preferably having a housing with a diameter of 5 mm to 25 mm. The height of the housing (distance between the upper and the lower side) does not exceed its diameter in a button cell. In this example, the pin preferably has a length of 2 mm to 20 mm and a diameter of 0.5 mm to 3 mm.

Further preferably, the energy storage element is a cylindrical round cell, preferably having a housing with a diameter of 5 mm to 25 mm. The height of the housing of the round cell (distance between the upper and the lower side) exceeds its diameter, preferably by a factor of 1.1 to 10, in particular by a factor of 1.5 to 5. In this example too, the pin preferably has a length of 2 mm to 20 mm and a diameter of 0.5 mm to 3 mm.

It is furthermore preferred for the energy storage element to be distinguished by at least one of the additional features a. and b.:
  a. The first and the second housing part are designed such that they are able moveable against each other along an axis running vertically through the circular upper side and the circular lower side of the housing, in particular through the circular bases of the housing parts.
  b. The pin is configured such that its electrical contact to one of the electrodes of the winding is broken when the housing parts move away from one another along the axis.

Features a. and b. above are particularly preferably implemented in combination with one another.

In a preferred example of feature b., the length of the pin is dimensioned such that the pin is able to lose contact with the terminal contact section delimiting the axial cavity or with the sleeve arranged in the cavity when the housing parts move away from one another along the axis.

Cells having housing parts designed in this way are known in WO 2012/048995 A1. They are distinguished in that their housings are designed such that the housing parts are able to slide away from one another to a defined degree when a pressure in the interior of the housing exceeds a threshold value. The safety concept behind this design is able to be understood with reference to FIG. 3A of WO 2012/048995 A1. On the one hand, the sliding apart from one another exposes apertures in the housing via which excess pressure is able to be dissipated. On the other hand, current collectors are able to be severed at intended disconnection points.

This safety concept is able to be transferred particularly well to my elements. In one example of an energy storage element that has a housing as described in WO 2012/048995 A1, electrical contact between the pin and the sleeve is able to be broken when the housing parts slide apart from one another when the pin and the terminal contact section delimiting the axial cavity or the sleeve arranged in the cavity are dimensioned appropriately.

My method is used to manufacture the energy storage element described above having the described housing and the described winding. It is distinguished in that an electrically conductive pin is arranged in the axial cavity of the winding to create electrical contact between one of the two metal housing parts and one of the electrodes of the energy storage element to be manufactured.

There are three particularly preferred examples of the method. In a first particularly preferred example, the method comprises the additional steps a. to c.:
  a. Providing one of the two housing parts in which the pin is fixed to an inner side.
  b. Providing the other of the two housing parts into which the winding is inserted.
  c. Joining the housing parts together to form the housing, wherein the pin is inserted into the axial cavity of the winding.

In this example, the winding is thus inserted into one of the two housing parts. Before or after the insertion, one of the electrodes of the winding is electrically connected to this housing part, for example, by welding a current collector to this housing part. When joining together takes place, electrical contact is then created between the other electrode of the winding and the other housing part, specifically when the pin, when inserted into the cavity, comes into contact, for example, with the terminal contact section delimiting the axial cavity or with a sleeve arranged in the cavity.

In a second particularly preferred example, the method comprises the additional steps a. to c.:
  a. Providing one of the two housing parts in which the pin is fixed to an inner side.
  b. The winding is inserted into this housing part, wherein the pin is inserted into the axial cavity of the winding.
  c. Joining the housing parts together to form the housing.

In this example, the winding is thus inserted into the housing part with the pin, wherein one of the electrodes of the winding is electrically connected to this housing part, specifically when the pin, when inserted into the cavity, comes into contact, for example, with the terminal contact section delimiting the axial cavity or with a sleeve arranged in the cavity. The housing part with the inserted winding is then joined together with the second housing part to form the housing.

In a third particularly preferred example, the method comprises the additional steps a. and b.:
  a. Providing the winding with the pin which is arranged in the axial cavity of the winding.
  b. When the winding is inserted into one of the housing parts, the pin is electrically connected to this housing part, or when the housing parts are joined together to form the housing, the pin is electrically connected to one of the housing parts.

In this example, the pin is thus initially arranged in the winding and connected to one of the housing parts when the housing is assembled.

Further features, details and preferences will become apparent from the appended claims and the abstract, the wording in both of which is given with reference to the contents of the description, of the following description of preferred examples and with reference to the drawings. Each is schematic and not necessary to scale.

The energy storage element 100 illustrated in FIG. 1 is a button cell. It comprises a housing 101 enclosing an interior 114, which housing is formed of a first metal housing part 103 and a second metal housing part 104 and has a circular upper side 101a and a circular lower side 101c that are spaced from one another and parallel to one another, and an annular housing side wall 101b that connects the upper side 101a and the lower side 101c. The first and the second housing part 103, 104 are both designed in a cup shape and each have a circular base 103a, 104a and an annular side wall 103b, 104b. The base 103a, 104a and the annular side wall 103b, 104b of the cup-shaped housing parts 103, 104 are each connected to one another by a transition region 103d, 104d designed as an edge. The annular side walls 103b, 104b are each delimited first by the transition regions and second by a circumferential free edge 103c, 104c that defines a circular opening.

An annular electrically insulating seal 105 is arranged between the housing parts 103 and 104.

A winding 106 is arranged in the interior 114, which winding comprises a strip-shaped positive and a strip-shaped negative electrode and a strip-shaped separator arranged between the electrodes, which are wound in a spiral around a winding axis 113.

The winding 106 has a first end face 106a and a second end face 106b and an annularly circumferential winding outer side 106c. It furthermore encloses the axial cavity 102 through which the winding axis 113 runs. The end faces 106a and 106b of the winding face in the direction of the circular and mutually parallel upper side 101a and lower side 101c such that the winding axis 113 is oriented perpendicular or at least substantially perpendicular to the upper side 101a and the lower side 101c. The end faces 106a and 106b are electrically insulated from the housing parts 103 and 104 by insulators in the form of insulating discs 107 and 108. These insulating discs 107 and 108 do not necessarily have to be present, in particular in examples in which, for example, a separator protrudes at the end faces 106a and 106b of the winding 106 and thus prevents contact between the electrodes and the housing.

An electrically conductive pin 109 is arranged in the cavity 102 and electrically connects one of the electrodes of the winding 106 to the housing part 103. This pin 109 is a solid metal pin that is fixed to an inner side of the housing part 103 by way of its first end 109a. The pin 109 is inserted into the cavity 102 of the winding 106 with the second, free end 109b at the front. The wall of the cavity 102 is formed partly by a terminal contact section 110 of a current collector of the electrode electrically connected to the housing part 103. The pin 109 bears directly on this wall and is therefore electrically connected to the contact section 110. A further electrode of the winding 106 is connected to the housing part 104 via the electrical conductor 112.

Figure 2:
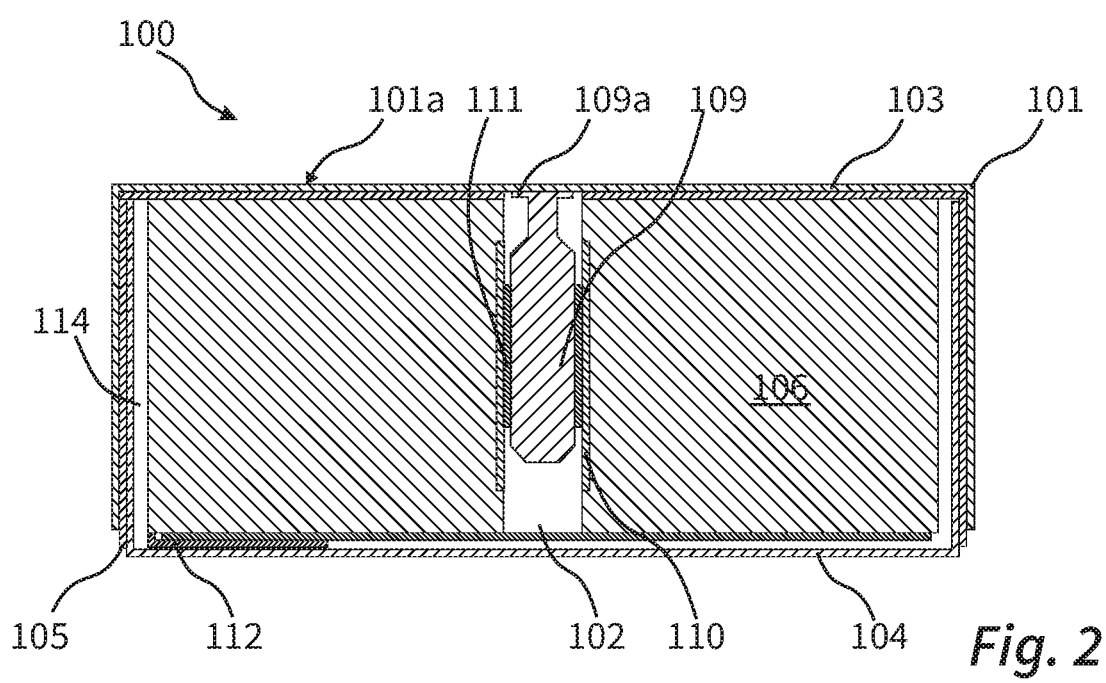
FIG. 2 shows one example of an energy storage element according to configuration B in a cross-sectional view.

The energy storage element 100 illustrated in FIG. 2 is likewise a button cell. This differs from the button cell illustrated in FIG. 1 in that a sleeve 111 is arranged in the cavity 102. The sleeve 111 is connected to the contact section 110 through welding. The pin 109 is inserted into the sleeve 111 and is in direct contact therewith.

The fact that this contact is releasable is apparent from FIGS. 3A and 3B. The housing of the energy storage element 100 in the form of a button cell in the same way as the housings of the button cells illustrated in FIGS. 1 and 2 as well, may be closed without crimping. The first and the second housing part 103 and 104 are designed such that they are able to be moved counter to one another along the winding axis 113. The length of the pin 109 is dimensioned such that the pin 109 loses contact with the sleeve 111 arranged in the cavity 102 when the housing parts 103 and 104 move away from one another along the winding axis 113.

What is claimed is:

1. An energy storage element comprising:
a housing enclosing an interior space, which housing is formed of a first metal housing part having a substantially circular upper side and a second metal housing part having a substantially circular lower side spaced from and parallel to the substantially circular upper side, and an annular housing side that connects the upper side and the lower side;
a winding arranged in the interior space, which winding comprises a strip-shaped positive and a strip-shaped negative electrode and a strip-shaped separator arranged between the electrodes that are wound in a spiral around a winding axis; wherein
the winding has a first end face and a second end face and an annularly circumferential winding outer side,
the first and second end faces face in the direction of the circular and mutually parallel upper side and lower side such that the winding axis is oriented perpendicular or at least substantially perpendicular to the upper side and the lower side, and
the winding has an axial cavity through which the winding axis runs; and
an electrically conductive pin arranged in the cavity and electrically connects one of the electrodes of the winding to one of the housing parts, wherein
the first and the second housing part are designed such that the circular upper side and the circular lower side of the housing parts are able movable away from each other along an axis running vertically through the circular upper side and the circular lower side of the housing when a pressure in the interior space of the housing exceeds a threshold value, and
the pin is configured such that the electrical contact to one of the electrodes of the winding is broken when the circular upper side and the circular lower side of the housing parts move away from one another along the axis.

2. The energy storage element according to claim 1, further comprising at least one of:
the pin has a first end fixed to an inner side of the housing part connected to one electrode via the pin, and a second free end,
the free end is a cone,
the pin comprises a shaft between the two ends,
the pin consists of a metal,
the pin is hollow or solid, and
the pin has a length that is less than a shortest distance between the end faces of the winding.

3. The energy storage element according to claim 1, wherein:
the positive and/or the negative electrode have a strip-shaped current collector covered at least in regions with electrode material, and
the positive and/or the negative electrode are divided into at least two sections in the longitudinal direction and have an active material section in which the current collector is covered with electrode material, and a terminal contact section in which the current collector is not covered with electrode material.

4. The energy storage element according to claim 3, wherein:
the terminal contact section delimits the axial cavity and forms a wall or the wall of the axial cavity, and
the pin is in direct contact with the terminal contact section delimiting the axial cavity.

5. The energy storage element according to claim 1, further comprising at least one of:
a sleeve that is electrically conductive is arranged in the cavity,
the sleeve is in electrical contact with the positive or the negative electrode,
the pin is in direct contact with the sleeve, and
the pin is inserted at least partly into the sleeve.

6. The energy storage element according to claim 1, wherein:
the first and the second housing part are both in a cup shape and each have a circular base and an annular side wall,
the first and the second housing part are electrically isolated from one another by an annular seal having electrically insulating properties,
the base and the annular side wall of the cup-shaped housing parts are each connected to one another by a transition region,
the annular side walls are each delimited first by the transition regions and second by a circumferential free edge that defines a circular opening, and
one of the housing parts is inserted into the other housing part with a circumferential free edge at the front such that the side walls of the housing parts overlap and form a double-wall annular housing region.

7. The energy storage element according to claim 2, further comprising at least one of:
the first and the second housing part are movable against each other along an axis running vertically through the circular upper side and the circular lower side of the housing parts, and
a length of the pin is dimensioned such that the pin is able to lose contact with a terminal contact section delimiting the axial cavity or with a sleeve arranged in the cavity when the housing parts move away from one another along the axis.

* * * * *